United States Patent
Zwisler et al.

(10) Patent No.: US 8,661,275 B2
(45) Date of Patent: Feb. 25, 2014

(54) IMPLEMENTING SLEEP LINES IN COMMODITY ETHERNET HARDWARE

(75) Inventors: Ross E. Zwisler, Lafayette, CO (US); Brian McKean, Longmont, CO (US)

(73) Assignee: LSI Corporation, San Jose, CA (US)

( * ) Notice: Subject to any disclaimer, the term of this patent is extended or adjusted under 35 U.S.C. 154(b) by 293 days.

(21) Appl. No.: 12/896,241

(22) Filed: Oct. 1, 2010

(65) Prior Publication Data

US 2012/0084590 A1    Apr. 5, 2012

(51) Int. Cl.
 *G06F 1/00*    (2006.01)
(52) U.S. Cl.
 USPC .......................... 713/323; 713/300
(58) Field of Classification Search
 USPC .......................... 713/323; 370/311
 See application file for complete search history.

(56) References Cited

U.S. PATENT DOCUMENTS

| | | | |
|---|---|---|---|
| 6,189,108 B1* | 2/2001 | Cromer et al. | 713/340 |
| 7,317,732 B2 | 1/2008 | Mills et al. | |
| 7,716,498 B1* | 5/2010 | Connor et al. | 713/300 |
| 2003/0210658 A1* | 11/2003 | Hernandez et al. | 370/311 |
| 2004/0207440 A1* | 10/2004 | Robertson et al. | 327/291 |
| 2006/0075269 A1* | 4/2006 | Liong et al. | 713/300 |
| 2006/0242328 A1* | 10/2006 | Guo et al. | 709/250 |
| 2007/0130332 A1* | 6/2007 | Malkin et al. | 709/224 |
| 2008/0104424 A1* | 5/2008 | Jennings | 713/300 |
| 2010/0246591 A1* | 9/2010 | Gobriel et al. | 370/412 |

* cited by examiner

*Primary Examiner* — Thomas Lee
*Assistant Examiner* — Robert Cassity
(74) *Attorney, Agent, or Firm* — Suiter Swantz pc llo

(57) ABSTRACT

A first Network Interface Controller operates in a low power mode. The first Network Interface Controller transitions from low power mode to a power-up sequence if a sleep packet in not received from a second Network Interface Controller at the first Network Interface Controller within a predetermined time threshold.

9 Claims, 3 Drawing Sheets

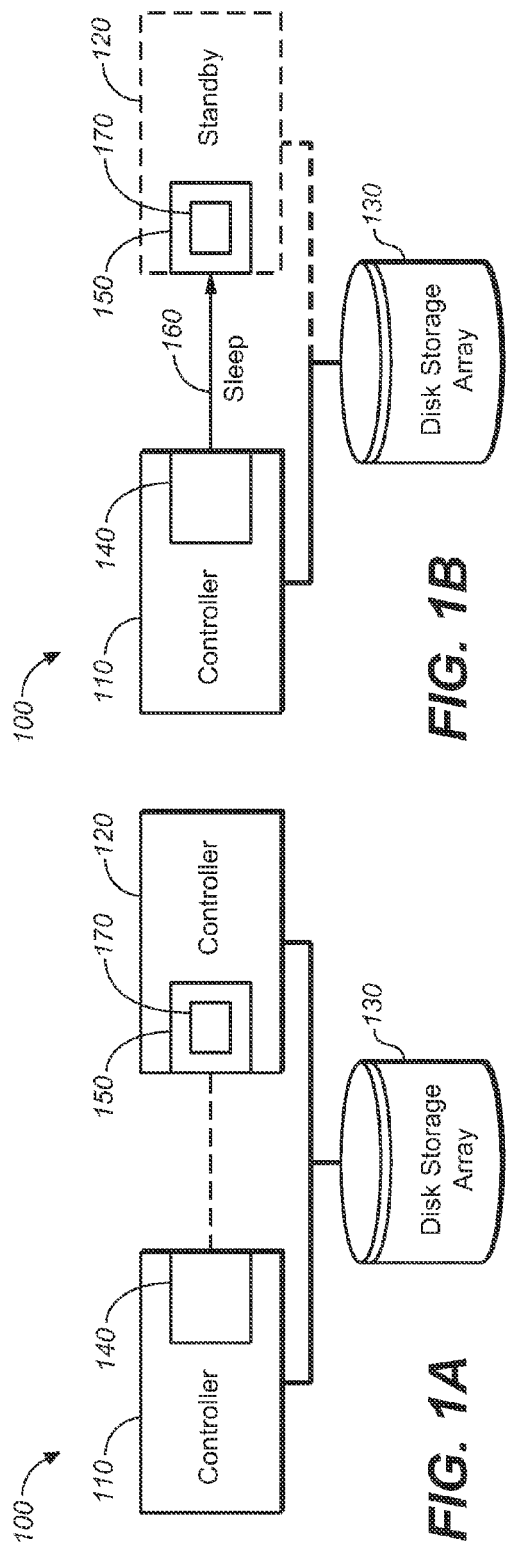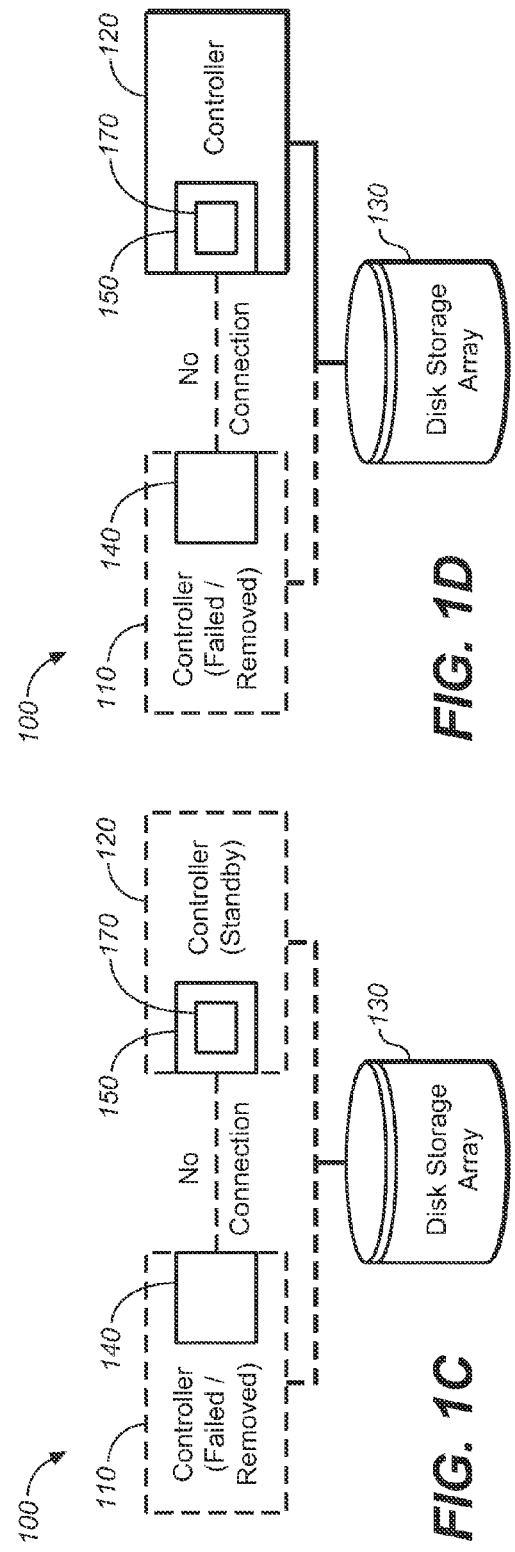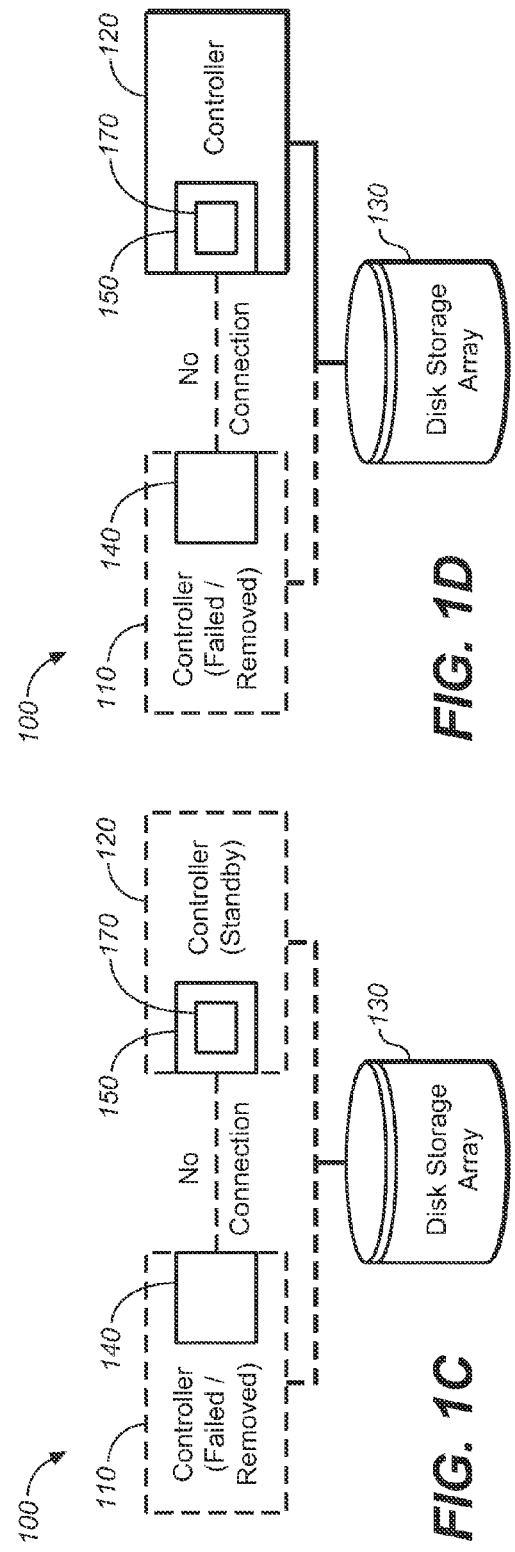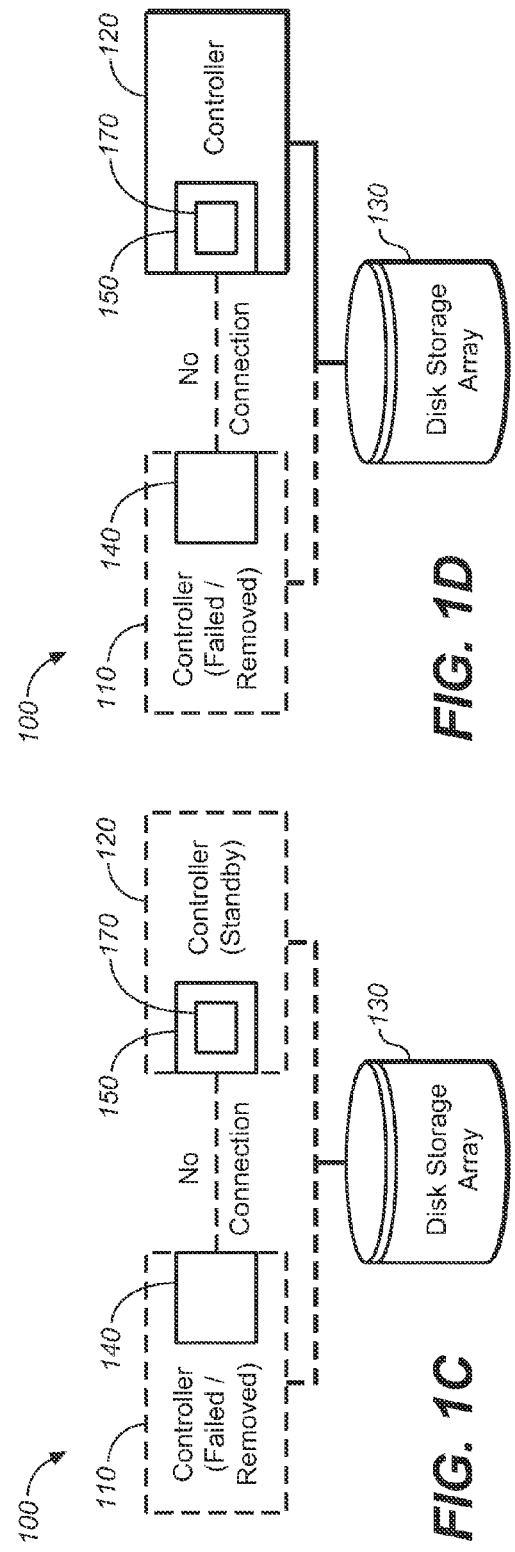

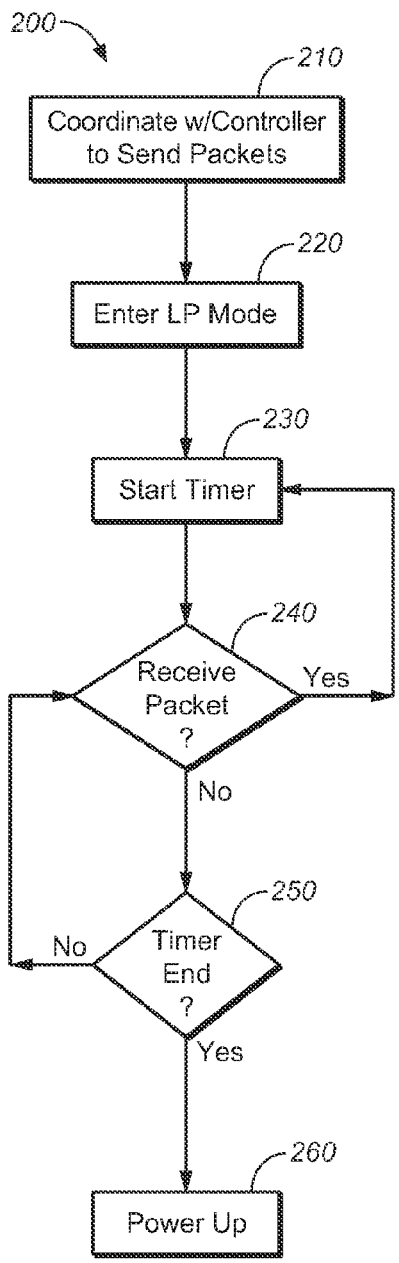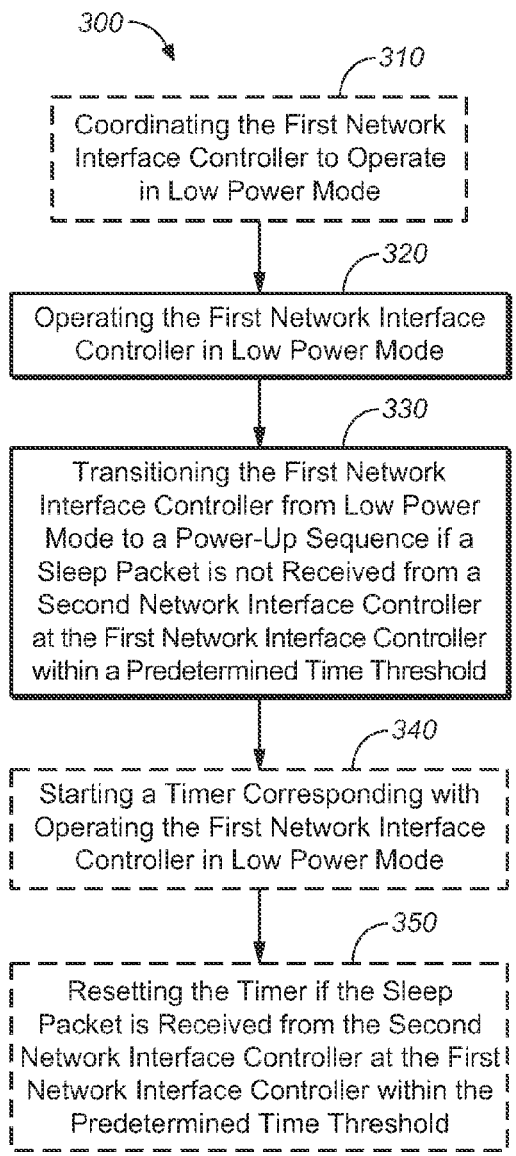
FIG. 2
FIG. 3

IMPLEMENTING SLEEP LINES IN COMMODITY ETHERNET HARDWARE

TECHNICAL FIELD

The present disclosure generally relates to the field of Network Interface Controllers (NICs), and more particularly to a computer program product, method, and device for providing power management functions for NICs.

BACKGROUND

In computer systems, it is often desirable for a system or device to enter a standby mode of operation with limited functionality and lower power consumption. Such a standby mode of operation may be controlled within the system or device. However, there are limited technologies available for a system or device to exit a standby mode and enter a standard mode of operation automatically without input from a second system or device.

SUMMARY

A method for power management may include, but is not limited to, operating a first NIC in a low power mode, and transitioning the first NIC from the low power mode to a power-up sequence if a sleep packet is not received from a second NIC at the first NIC within a predetermined time threshold.

A Network Interface Controller may include, but is not limited to a memory for storing firmware configured to operate the NIC, a bus communicatively coupled to the memory for data transfers within the NIC, a processor communicatively coupled to the bus for executing the firmware, a transceiver communicatively coupled to the bus for sending data from the NIC and receiving data to the NIC, and an Ethernet port communicatively coupled to the bus for providing a physical data interface between the NIC and an Ethernet network. The firmware is configured to perform a method for power management of the NIC, the method comprising operating the NIC in a low power mode, and transitioning the NIC from the low power mode to a power-up sequence if a sleep packet is not received from a second NIC at the NIC within a predetermined time threshold.

A non-transitory computer-readable medium having computer-executable instructions for performing a method for power management, the method may include, but is not limited to operating a first NIC in a low power mode, and transitioning the first NIC from the low power mode to a power-up sequence if a sleep packet is not received from a second NIC at the first NIC within a predetermined time threshold.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIGS. 1A-1D is a block diagram of a dual controller storage system topology at various stages of operation in accordance with the present disclosure;

FIG. 2 is a flowchart diagram illustrating the flow between various stages of power management operation in accordance with the present disclosure;

FIG. 3 is a flowchart diagram illustrating of method of power management in accordance with the present disclosure and FIG. 4 is a block diagram illustrating a NIC in accordance with the present disclosure.

DETAILED DESCRIPTION

Figure 4:
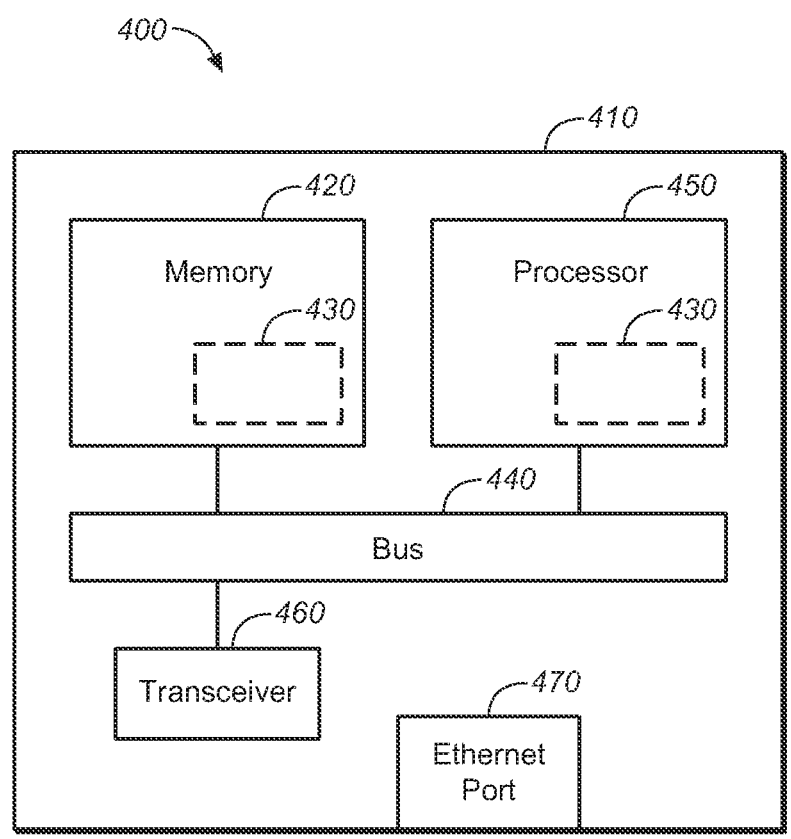

Reference will now be made in detail to the subject matter disclosed, which is illustrated in the accompanying drawings.

Referring generally to FIGS. 1A-1D, a topology of a dual controller storage system 100 is shown. System 100 may be a part of a larger storage topology. Topology 100 may include a first controller 110 and a second controller 120. As shown in FIG. 1A, each of first controller 110 and second controller 120 may operate disk storage array 130. Disk storage array 130 may be a single disk storage device or a plurality of disk storage devices. First controller 110 may include a first Network Interface Controller (NIC) 140. Second controller 120 may include a second NIC 150. First NIC 140 and second NIC 150 may each be Ethernet NICs including Ethernet ports, however, other networking technologies and ports are contemplated by the current disclosure. First NIC 140 and second NIC 150 may each be integrated into an expansion card. In another embodiment, first NIC 140 and second NIC 150 may each be integrated into a motherboard of a computing device (ex—storage controller, computer). First NIC 140 and second NIC 150 may be communicatively coupled via a network. In an alternate embodiment, first NIC 140 and second NIC 150 may be communicatively coupled via a direct connection. First NIC 140 may operate to transition first controller 110 into a low power mode of operation or initiate a power-up sequence for first controller 110. First NIC 140 and second NIC 150 may be capable of data communications while in low power mode. Similarly, second NIC 150 may operate to transition second controller 120 into a low power mode of operation or initiate a power-up sequence for second controller 120.

As shown in FIG. 1B, second controller 120 may be operating in low power mode (ex—standby mode, reduced power mode). Second controller 120 and first controller 110 may have coordinated for second controller 120 to operate in a low power mode. The coordination between first controller 110 and second controller 120 may have been initiated from either of first controller 110 or second controller 120. Similarly, coordination between first NIC 140 and second NIC 150 may have been initiated from either of first NIC 140 and second NIC 150. Coordination between first NIC 140 and second NIC 150 may include communication between first NIC 140 and second NIC 150. Coordination between first NIC 140 and second NIC 150 may include setting a predetermined time threshold. Second controller 120 is no longer able to operate disk storage array 130, because it is operating in a low power mode. First NIC 140 is periodically sending a sleep packet 160 which is received by second NIC 150. Sleep packet 160 may be a specialized broadcast frame containing a particular sequence of bits. In an alternate embodiment, sleep packet 160 may refer to a specialized communication method which may be received and transmitted via a NIC. Second NIC 150 is running a timer 170 which started upon the second controller 120 operating in a low power mode. The starting of timer 170 may correspond to the second controller 120 transitioning to a low power mode. For example, the starting of timer 170 and the transitioning of second controller 120 to a low power mode may occur simultaneously. In other embodiments, the starting of timer 170 may occur previous to the transitioning of second controller 120 to a low power mode or the starting of timer 170 may occur after the transitioning of second controller 120 to a low power mode. Timer 170 is reset each time sleep packet 160 is received by second NIC 150. Timer 170 may be utilized to determine whether a predetermined time threshold has been reached.

Other methods of determining a whether a predetermined time threshold has been reached are contemplated by the current disclosure. Timer 170 may be external (not shown) to second controller 120. As stated herein, starting of timer 170 may refer to any method of recording a time reference for determination of a whether a predetermined time threshold has been reached. Resetting of timer 170 may refer to any method of discarding or ignoring the previous time reference and recording a new time reference for determination of whether a predetermined time threshold has been reached.

As shown in FIG. 1C, first controller 110 is no longer controlling disk storage array 130. First controller 110 may have failed or may have been removed. In another embodiment (not shown), first controller 110 may not have failed or not have been removed, but may require second controller 120 to power on. In either case, first NIC 140 of first controller 110 is no longer periodically sending a sleep packet 160 which is received by second NIC 150 of second controller 120. Timer 170 has not reset, and will eventually reach a predetermined time threshold. Second NIC 150 may initiate a power-up sequence for second controller 120 corresponding to timer 170 reaching the predetermined time threshold. As shown in FIG. 1D, second controller 120 has completed the power-up sequence. Second controller 120 is now operating to control disk storage array 130.

Referring generally to FIG. 2, a flowchart 200 illustrating an embodiment of the phases of operation of a NIC which operates in a low power mode according to an embodiment of the present disclosure. Flowchart 200 may begin with a block 210 representing coordinating between a NIC 150 and outside NIC 140 to begin power management operations. Flowchart 200 may further include block 220 representing the NIC 150 transitioning into a low power mode of operation. Flowchart 200 may proceed to block 220 from block 210. Flowchart 200 may further include block 230 representing starting a timer 170 within the NIC 150. In an alternate embodiment, the timer may be external to the NIC. Starting a timer, as represented in block 230, may refer to either starting a timer or resetting a timer. Flowchart 200 may proceed to block 230 from block 220. Flowchart 200 may further include decision block 240 representing determining whether the NIC 150 has received a sleep packet. Flowchart 200 may proceed to block 240 from block 230.

Flowchart 200 may further include decision block 250 representing determining whether the timer has reached a predetermined threshold. Flowchart 200 may proceed to decision block 250 from decision block 240 upon determining the NIC 150 has not received a sleep packet. Flowchart 200 may proceed to block 230 from decision block 240 upon determining the NIC has received a sleep packet. Flowchart 200 may further include block 260 representing the NIC initiating a power-up sequence. Flowchart 200 may proceed to block 260 from decision block 250 upon determining the timer has reached a predetermined time threshold. Flowchart 200 may proceed to decision block 240 from decision block 250 upon determining the timer has not reached a predetermined time threshold.

Referring generally to FIG. 3, a flowchart illustrating a method 300 for power management is shown. The method 300 may include a block 310 representing coordinating a first NIC to operate in a low power mode. For example, the first NIC may operate within a first storage controller and a second NIC may operate within a second storage controller. In other embodiments, at least one of the first NIC or the second NIC may operate within a computer. The first storage controller may notify the second storage controller of the first storage controller operating in a low power mode to coordinate the first NIC to operate in a low power mode. In an alternate embodiment, the first storage controller may receive a request from the second storage controller to operate in a low power mode.

The method 300 may further include a block 320 representing operating the first NIC in low power mode. Operating the first NIC 150 in the low power mode may include operating the first storage controller in a low power mode. In other embodiments, operating the first NIC 150 in the low power mode may include operating any device containing the first NIC (ex—computer, computing system, information handling device) in a low power mode. The method 300 may further include a block 330 representing transitioning the first NIC from low power mode to a power-up sequence if a sleep packet is not received from a second NIC 140 at the first NIC 150 within a predetermined time threshold. In an embodiment, the sleep packet may be received via an Ethernet connection. Transitioning the first NIC 150 from low power mode to a power-up sequence may include initiating a power-up sequence for the device containing the first NIC (ex—storage controller, computer, information handling device). The method 300 may further include a block 340 representing starting a timer 170 within the first NIC corresponding with operating the first NIC in the low power mode.

The method 300 may further include a block 350 representing resetting the timer if the sleep packet is received from the second NIC 140 at the first NIC 150 within the predetermined time threshold.

Referring generally to FIG. 4, a diagram 400 illustrating a Network Interface Controller (NIC) 410 is shown. NIC 410 may include a memory 420. Memory 420 may store firmware 430 configured to operate the NIC 410. NIC 410 may further include a bus 440. Bus 440 may be communicatively coupled to the memory 420 for data transfers within the NIC 410. NIC 410 may further include a processor 450. Processor 450 may be communicatively coupled to the bus 440. Processor 450 may execute the firmware 430 for performing a method for power management of the NIC. For example, processor 450 may execute firmware 420 to perform method 300. NIC 410 may further include a transceiver 460. Transceiver 460 may be communicatively coupled to the bus 440 for data transfer. For example, transceiver 460 may send data from the NIC 410 and receive data to the NIC 410. NIC 410 may further include an Ethernet port 470. Ethernet port 470 may be communicatively coupled to the bus 440. Ethernet port 470 may provide a physical data interface between the NIC 410 and an Ethernet network. Data transfers to and from transceiver 460 may be performed via Ethernet port 470.

In the present disclosure, the methods disclosed may be implemented as sets of instructions or software or firmware readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is to be understood that the present invention may be conveniently implemented in forms of a software package. Such a software package may be a computer program product or firmware which employs a computer-readable storage medium including stored computer code which is used to program a computer or processor to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for power management, comprising:
coordinating a first Network Interface Controller (NIC) to operate in a low power mode, coordinating the first NIC to operate in the low power mode includes receiving an instruction to operate in low power mode from a second NIC;
receiving a predetermined time threshold from the second NIC;
operating the first NIC in the low power mode;
starting a timer automatically in response to the first NIC operating in the low power mode, the timer being located internal to the first NIC or external to the first NIC;
transitioning the first NIC from the low power mode to a power-up sequence if a sleep packet is not received from the second NIC at the first NIC within the predetermined time threshold; and
resetting the timer if the sleep packet is received from the second NIC at the first NIC within the predetermined time threshold, wherein the first NIC operates within a first storage controller, wherein the transitioning the first NIC from the low power mode to the power-up sequence if the sleep packet is not received from the second NIC at the first NIC within the predetermined time threshold includes initiating a power-up sequence for the first storage controller.

2. The method of claim 1, wherein the operating the first NIC in the low power mode includes:
operating the first storage controller in a controller low power mode.

3. The method of claim 1, wherein the coordinating the first NIC to operate in the low power mode includes:
a first storage controller receiving a request from a second storage controller to operate in the low power mode.

4. The method of claim 1, wherein the coordinating the first NIC to operate in the low power mode includes:
the first storage controller notifying a second storage controller of the first storage controller operating in the low power mode.

5. A Network Interface Controller (NIC), comprising:
a memory for storing firmware configured to operate the NIC;
a bus communicatively coupled to the memory for data transfers within the NIC;
a processor communicatively coupled to the bus for executing the firmware;
a transceiver communicatively coupled to the bus for sending data from the NIC and receiving data to the NIC; and
an Ethernet port communicatively coupled to the bus for providing a physical data interface between the NIC and an Ethernet network,
wherein the firmware is configured to perform a method for power management of the NIC, the method comprising:
receiving a predetermined time threshold from a second NIC;
operating the NIC in a low power mode after receiving an instruction to operate in low power mode from the second NIC;
starting a timer automatically in response to the NIC operating in the low power mode, the timer being located internal to the NIC or external to the NIC,
transitioning the NIC from the low power mode to a power-up sequence if a sleep packet is not received from the second NIC at the NIC within the predetermined time threshold, and
resetting the timer if the sleep packet is received from the second NIC at the NIC within the predetermined time threshold, wherein the NIC operates within a storage controller, wherein the transitioning the NIC from the low power mode to the power-up sequence if the sleep packet is not received from the second NIC at the NIC within the predetermined time threshold includes initiating a power-up sequence for the storage controller.

6. The NIC of claim 5, wherein operating the NIC in a low power mode includes operating the storage controller in a low power mode.

7. A non-transitory computer-readable medium having computer-executable instructions for performing a method for power management, the method comprising:
coordinating a first Network Interface Controller (NIC) to operate in a low power mode, coordinating the first NIC to operate in the low power mode includes receiving an instruction to operate in low power mode from a second NIC;
receiving a predetermined time threshold from the second NIC;
operating the first NIC in the low power mode;
starting a timer automatically in response to the first NIC operating in the low power mode, the timer being located at least one of internal to the first NIC or external to the first NIC;
transitioning the first NIC from the low power mode to a power-up sequence if a sleep packet is not received from the second NIC at the first NIC within the predetermined time threshold; and
resetting the timer if the sleep packet is received from the second NIC at the first NIC within the predetermined time threshold, wherein the first NIC operates within a first storage controller, wherein the transitioning the first NIC from the low power mode to the power-up sequence if the sleep packet is not received from the second NIC at the first NIC within the predetermined time threshold includes initiating a power-up sequence for the first storage controller.

8. The non-transitory computer-readable medium of claim 7, wherein the coordinating the first NIC to operate in the low power mode includes:
   the second NIC requesting the first NIC to operate in a low power mode.

9. The non-transitory computer-readable medium of claim 7, wherein the coordinating a first NIC to operate in a low power mode includes:
   the first NIC notifying the second NIC of the first NIC operating in a low power mode.

* * * * *